US008581939B2

(12) United States Patent
Abe

(10) Patent No.: US 8,581,939 B2
(45) Date of Patent: Nov. 12, 2013

(54) TERMINAL DEVICE WITH DISPLAY FUNCTION

(75) Inventor: Tatsuhiko Abe, Osaka (JP)

(73) Assignee: KYOCERA Corporation, Kyoto (JP)

( * ) Notice: Subject to any disclaimer, the term of this patent is extended or adjusted under 35 U.S.C. 154(b) by 567 days.

(21) Appl. No.: 12/922,231

(22) PCT Filed: Mar. 11, 2009

(86) PCT No.: PCT/JP2009/054691
§ 371 (c)(1),
(2), (4) Date: Sep. 13, 2010

(87) PCT Pub. No.: WO2009/113588
PCT Pub. Date: Sep. 17, 2009

(65) Prior Publication Data
US 2011/0012931 A1    Jan. 20, 2011

(30) Foreign Application Priority Data
Mar. 14, 2008   (JP) ................................. 2008-065670

(51) Int. Cl.
*G09G 5/00* (2006.01)

(52) U.S. Cl.
USPC .......................................... 345/660; 345/1.3

(58) Field of Classification Search
USPC ................................. 345/1.3, 660
See application file for complete search history.

(56) References Cited

U.S. PATENT DOCUMENTS

| 6,859,219 | B1 * | 2/2005 | Sall ................................. | 345/1.1 |
| 7,969,382 | B2 * | 6/2011 | Kim et al. ...................... | 345/1.1 |
| 8,208,248 | B2 * | 6/2012 | Koenig ................... | 361/679.04 |

| 2003/0119562 | A1 | 6/2003 | Kokubo |
| 2004/0198457 | A1 | 10/2004 | Hayashida et al. |
| 2005/0083642 | A1 | 4/2005 | Senpuku et al. |
| 2006/0293088 | A1 | 12/2006 | Kokubo |

FOREIGN PATENT DOCUMENTS

| JP | 06-266347 | 9/1994 |
| JP | 2002-44202 | 2/2002 |
| JP | 2003-091410 | 3/2003 |
| JP | 2003-162355 | 6/2003 |
| JP | 2004-062624 | 2/2004 |
| JP | 2004-288208 | 10/2004 |
| JP | 2005-086283 A | 3/2005 |
| JP | 2005-215453 | 8/2005 |
| JP | 2007-148350 | 6/2007 |
| JP | 2007-280029 | 10/2007 |
| WO | 03/077097 A1 | 9/2003 |

OTHER PUBLICATIONS

Notification of Reasons for Refusal for JP Patent Application No. 2008-065670 dated Jul. 13, 2010.

(Continued)

*Primary Examiner* — Ryan R Yang
(74) *Attorney, Agent, or Firm* — Procopio, Cory, Hargreaves & Savitch LLP

(57) ABSTRACT

A display controller executes a comparison mode if a display state is switched to a second display state after one of multiple files is selected from a list of thumbnail images in a first display state. In the comparison mode, the display controller displays a magnified image of the selected file on a first display area at a size suitable for the number of magnified images displayed on the first display area at that time. Accordingly, a desired image can easily be selected from stored images in a terminal device with a display function such as a cell phone.

13 Claims, 19 Drawing Sheets

(56) References Cited

OTHER PUBLICATIONS

International Search Report from PCT/JP2009/054691 dated Apr. 21, 2009.
Written Opinion of the International Searching Authority dated Nov. 2, 2010 for International Application No. PCT/JP2009/054691.

Notification of Grounds for Rejection dated Nov. 24, 2011, issued in counterpart Korean Patent Application No. 2010-70228846.
Notification of Reasons for Refusal dated Dec. 21, 2010 issued by the Japanese Patent Office for the corresponding Japanese Application No. JP 2008-065670.

* cited by examiner

Fig.15
(a)
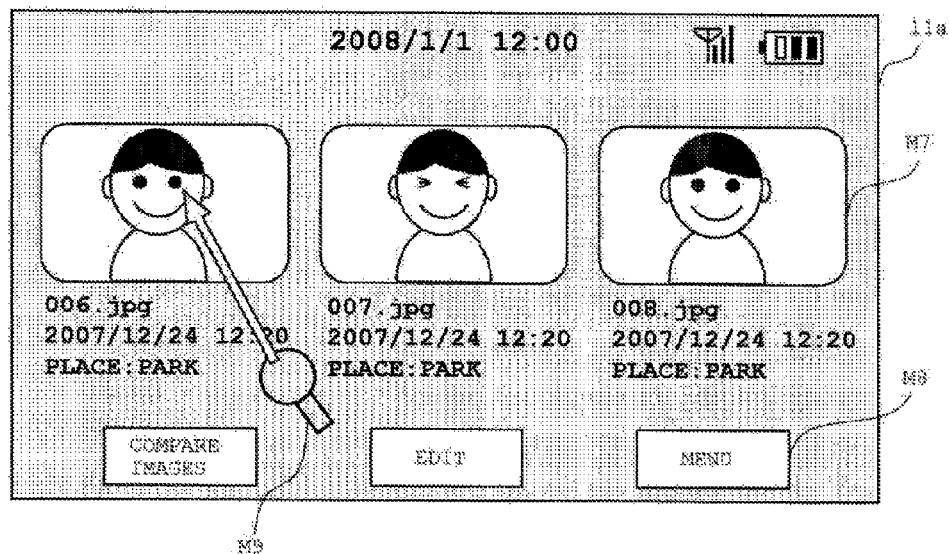
(b)
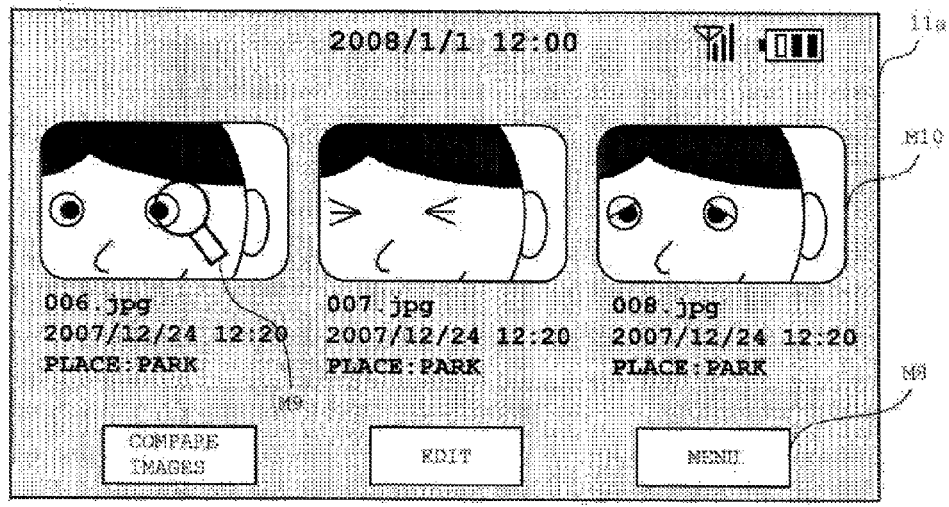

Fig.16
(a)
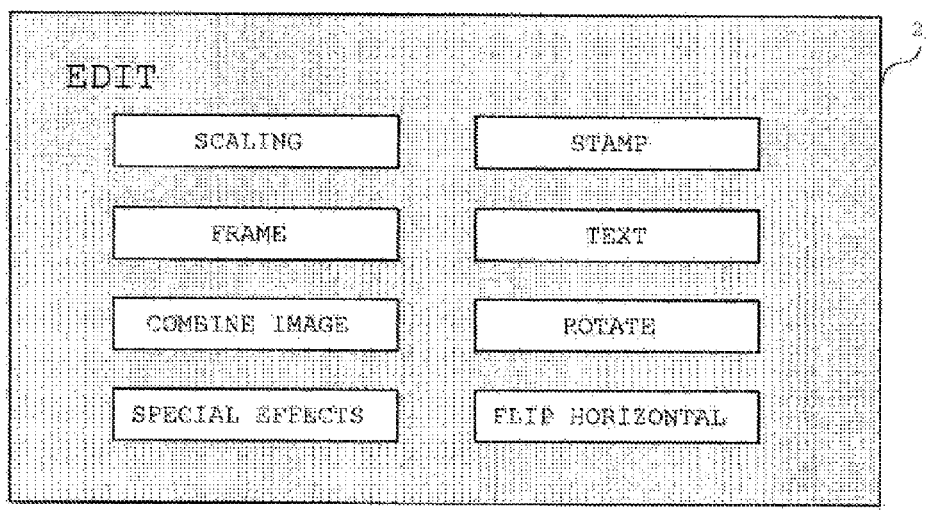
(b)
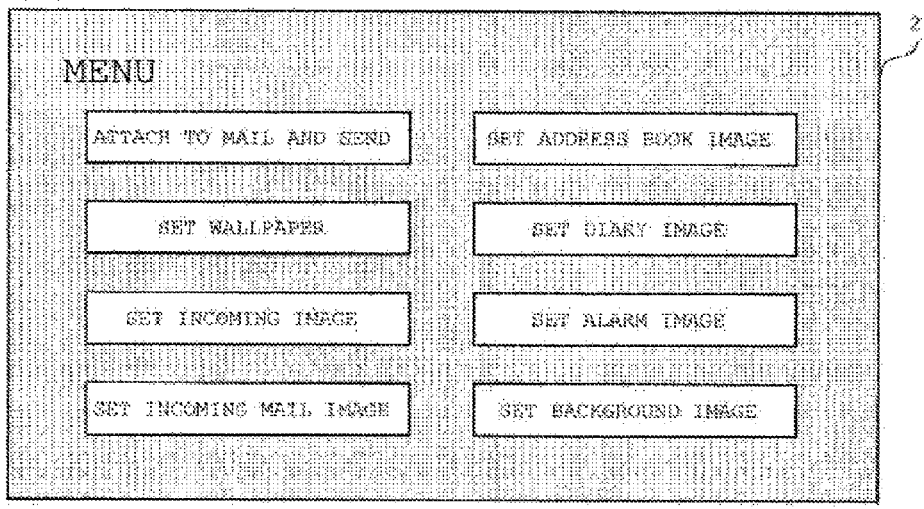

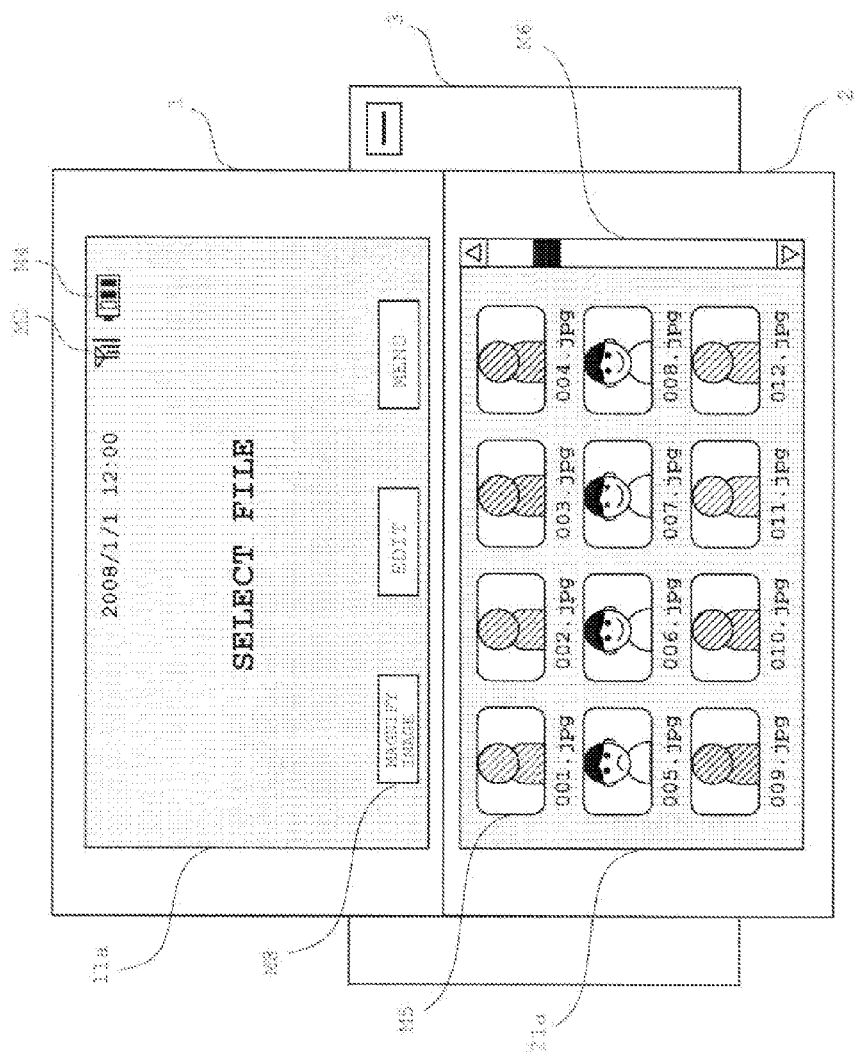

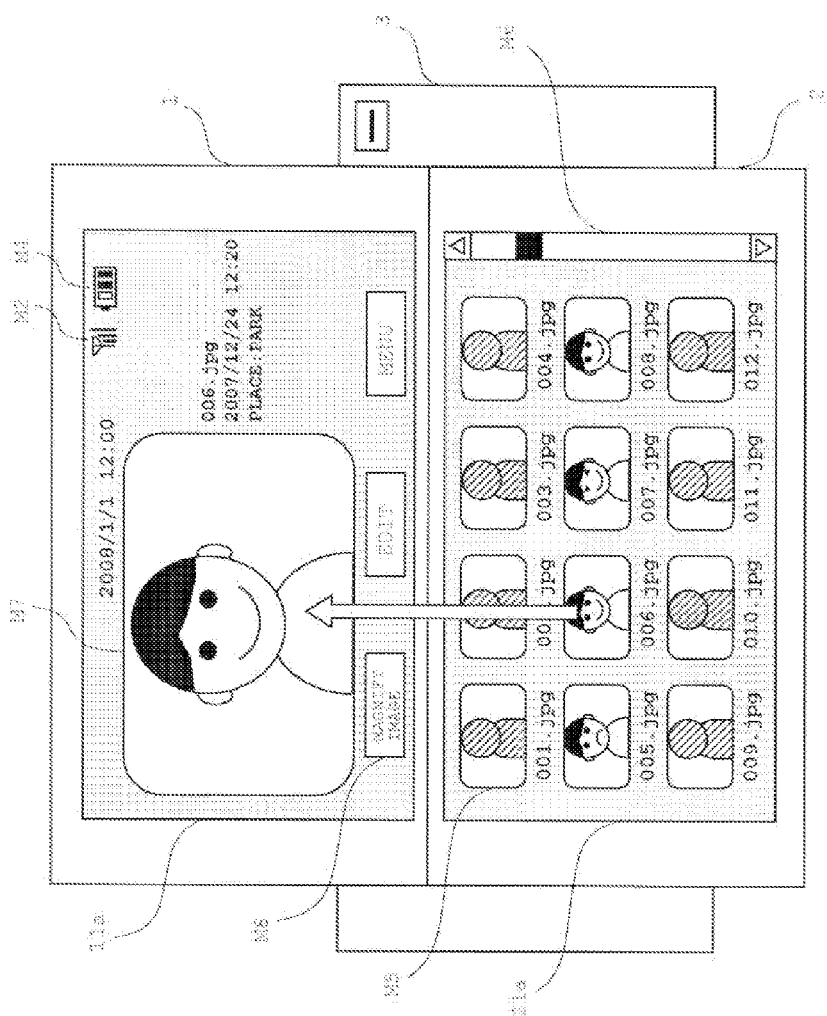

TERMINAL DEVICE WITH DISPLAY FUNCTION

TECHNICAL FIELD

The present invention relates to a terminal device with a display function, and more particularly, the invention is suitably used for a portable terminal device such as a cell phone and a Personal Digital Assistant (PDA).

BACKGROUND ART

Generally, a portable terminal device such as a cell phone includes a liquid crystal display, and various kinds of information are displayed on its display area. If the display area is large, a large amount of information (such as texts) can be displayed at a time, and a television pictures can be displayed in a large size. If the display area becomes large, however, a size of the device itself is increased and the device increased in size is prone to bother the user when carried.

In view of such circumstances, the following configuration, for example, can be employed: a cell phone includes two display areas, and it is possible to switch between a state where the display areas are superposed one above the other and a state where the display areas are laterally arranged side by side. According to this cell phone, when the two display areas are superposed one above the other, since the device body becomes smaller, the cell phone is less prone to bother the user when carried. When the two display areas are arranged side by side upon its use, an image can be displayed on the large screen.

DISCLOSURE OF THE INVENTION

Problem to be Solved by the Invention

Many cell phones include a camera function. An image (still image or moving image) shot by the camera function is stored in an embedded memory or a memory card set in the cell phone. According to many cell phones, images can be downloaded from various kinds of Web sites through a line of communication, and these images are also stored in the embedded memory or the like.

From the image stored in the memory, a thumbnail image of an original image is formed by thumbnail forming process. A list screen of the thumbnail images is displayed on the display area in a predetermined functional mode. A user sees the list screen of the thumbnail images and can check what images are stored.

If a larger display region is formed by arranging two display areas side by side as in this cell phone, since the entire list image can be increased in size, more thumbnail images can be displayed at a time. Therefore, when the user selects a desired image from the stored images, the user does not need to frequently scroll the list screen, and usability is enhanced.

A plurality of similar images such as successive pictures is included in stored images in some cases. When selecting a desired image (most excellently shot picture for example) from the similar images, since images are too small in this thumbnail image size and it is difficult finely compare the images with each other. Hence, it is preferable that images can be easily selected in such a case.

The present invention is for solving the problem, and in a terminal device with a display function such as a cell phone, it is an object of the invention to make it possible to easily select a desired image from stored images.

Means to Solve the Problem

A terminal device with a display function of the present invention includes a first display unit, a second display unit, a display controller which controls display of the first and second display units, a storage section in which a plurality of sets of image information is stored, and a mechanism for disposing the first and second display units at positions where display areas of both the first and second display units face outside. Here, the display controller displays a list of first images based on the image information sets on one of the first and second display units in a state where both the display areas face outside, and the display controller displays, on the other display unit, one or more second images corresponding to one or more of the first images selected from the list at a size suitable for the number of the second images displayed on the display area of the other display unit.

According to the terminal device with the display function of the invention, the user can easily select a desired image from the list.

BRIEF DESCRIPTION OF THE DRAWINGS

FIG. 15 are diagrams showing examples of screen display in the magnify-image mode in the cell phone according to the embodiment;

FIG. 16 are diagrams showing examples of screen display in an edit mode and a menu selection mode in the cell phone according to the embodiment;

FIG. 18 is a diagram showing an example of a screen display in the modification in the cell phone according to the embodiment; and FIG. 19 is a diagram showing the example of the screen display in the modification in the cell phone according to the embodiment.

Figure 1:
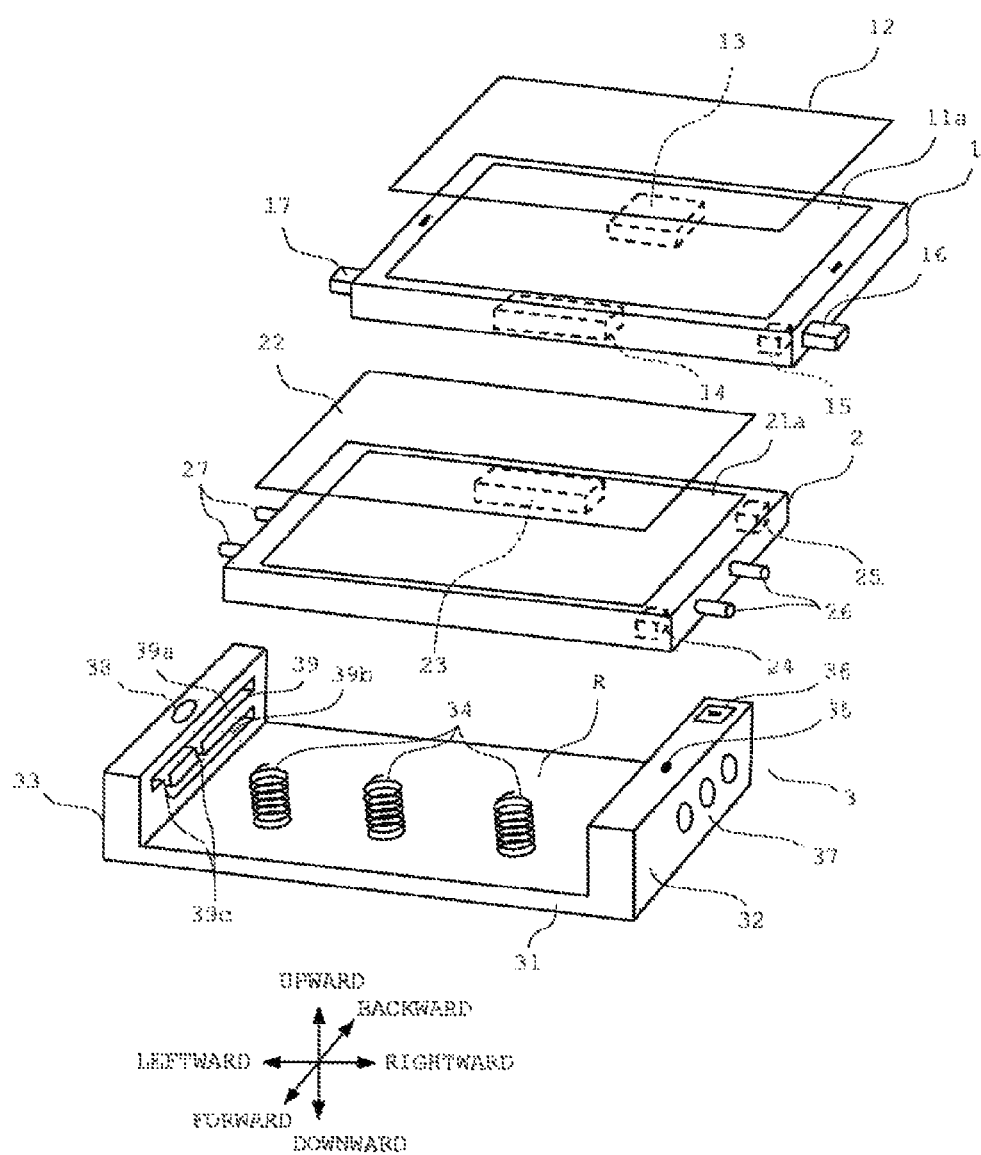
FIG. 1 is a diagram showing a configuration of a cell phone according to an embodiment.

The drawings are only for the purpose of explaining the invention, and the drawings do not limit the scope of the invention.

BEST MODE FOR CARRYING OUT THE INVENTION

An embodiment of the present invention will be described below with reference to the drawings.

In the embodiment described below, liquid crystal displays 11 and 21 respectively correspond to a "first display unit" and a "second display unit" in claims. Magnets 14 and 23, projections 16 and 17, shafts 26 and 27, a coil spring 34 and a guide groove 39 correspond to a "mechanism" in claims. A memory 400 corresponds to a "storage section" in claims. A thumbnail image M5 corresponds to a "first image" in claims, a magnified image M7 corresponds to a "second image" and a "fourth image" in claims, and a partially magnified image M10 corresponds to a "third image" in claims.

FIG. 1 is a diagram (exploded perspective view) showing a configuration of a cell phone according to the embodiment of the present invention. The cell phone includes a first cabinet 1, a second cabinet 2, and a holder 3 which holds the first and second cabinets 1 and 2.

The first cabinet 1 has a vertically thin and laterally long rectangular parallelepiped shape. A later-described liquid crystal display 11 (not shown) is embedded in the first cabinet 1, and a display area 11a ("first display area", hereinafter) of the liquid crystal display 11 faces outside from a front surface of the first cabinet 1. A touch panel 12 is mounted on the first display area 11a. When the user pushes various kinds of keys displayed on the first display area 11a, the touch panel 12 detects the pushed position, and outputs a signal (position signal) corresponding to the position.

A camera module 13 is disposed in the first cabinet 1 at a central and slightly rear location thereof. A lens window (not shown) for taking a subject image in the camera module 13 is provided in a lower surface of the first cabinet 1. A magnet 14 is disposed in the first cabinet 1 at a central location thereof near a front surface, and a magnet 15 is dispose in the first cabinet 1 at a right front corner. Projections 16 and 17 are provided on a right side surface and a left side surface of the upper cabinet 1, respectively.

A second cabinet 2 has a vertically thin and laterally long rectangular parallelepiped shape. That is, the second cabinet 2 has substantially the same shape and size as those of the first cabinet 1. A later-described liquid crystal display 21 (not shown) is embedded in the second cabinet 2, and a display area 21a ("second display area", hereinafter) of the liquid crystal display 21 faces outside from a front surface of the second cabinet 2. A size of the second display area 21a is the same as that of the first display area 11a. A touch panel 22 is mounted on the second display area 21a. When the user pushes various kinds of keys displayed on the second display area 21a, the touch panel 22 detects the pushed position, and outputs a signal (position signal) corresponding to the position.

A magnet 23 is disposed in the second cabinet 2 at a central location thereof near a rear surface. The magnet 23 and the magnet 14 of the first cabinet 1 attract each other when the first cabinet 1 and the second cabinet 2 are in a state (second display state) where they are located at a position constituting a large screen as will be described later. If a magnetic force of one of the magnets in the first cabinet 1 and the second cabinet 2 is sufficiently strong, the other magnet may be replaced by a magnetic body.

In the second cabinet 2, a close-sensor 24 is disposed at a right front corner, and an open-sensor 25 is disposed at a right rear corner. The close-sensor 24 and the open-sensor 25 are formed from Hall ICs, react with a magnetic force of the magnet 15 and output a detection signal. As will be described later, if the first cabinet 1 and the second cabinet 2 are superposed on each other, since the magnet 15 of the first cabinet 1 approaches the close-sensor 24, the close-sensor 24 outputs an ON signal. On the other hand, if the first cabinet 1 and the second cabinet 2 are arranged side by side in the longitudinal direction, since the magnet 15 of the first cabinet 1 approaches the open-sensor 25, the open-sensor 25 outputs an ON signal.

Two shafts 26 are provided on a right side surface of the second cabinet 2, and two shafts 27 are provided on a left side surface of the second cabinet 2.

The holder 3 includes a bottom plate 31, a right holder portion 32 formed on a right end of the bottom plate 31, and a left holder portion 33 formed on a left end of the bottom plate 31. The first cabinet 1 and the second cabinet 2 are accommodated in an accommodating region R surrounded by the bottom plate 31, the right holder portion 32 and the left holder portion 33 in a state where the cabinets 1 and 2 are superposed one above the other.

Three coil springs 34 are arranged in the lateral direction on the bottom plate 31. The coil springs 34 abut against a lower surface of the second cabinet 2 in a state where the second cabinet 2 is mounted on the holder 3, and apply a force for pushing up the second cabinet 2.

A microphone 35 and a power button 36 are disposed on an upper surface of the right holder portion 32. An operation button group 37 is disposed on an outer side surface of the right holder portion 32. The operation button group 37 includes a plurality of operation buttons such as a setup button of a silent mode. General functions are executed by operating these operation buttons without operating the touch panels 12 and 22. A speaker 38 is disposed on an upper surface of the left holder portion 33. A user holds the cell phone such that the left holder portion 33 comes to an ear and the right holder portion 32 comes to a mouth of the user for a phone call.

Guide grooves 39 (only one of them on the side of the left holder portion 33 is illustrated) are formed in inner side surfaces of the right holder portion 32 and the left holder portion 33. Each of the guide grooves 39 includes an upper groove 39a and a lower groove 39b which extend in the longitudinal direction, and two vertical grooves 39c vertically extending such as to be connected to the upper groove 39a and the lower groove 39b. The vertical grooves 39c are formed on the front side of the upper groove 39a and the lower groove 39b.

When the cell phone is assembled, the shafts 26 and 27 are inserted into the lower grooves 39b of the guide grooves 39, the second cabinet 2 is disposed in the accommodating region R of the holder 3, the projections 16 and 17 are inserted into the upper grooves 39a of the guide grooves 39, and the first cabinet 1 is disposed in the accommodating region R of the holder 3 and on the second cabinet 2.

In this way, the first cabinet 1 is guided by the upper grooves 39a and can slide in the longitudinal direction. The second cabinet 2 is also guided by the lower grooves 39b and can slide in the longitudinal direction. If the second cabinet 2 moves forward and the shafts 26 and 27 reach the vertical grooves 39c, the second cabinet 2 is guided by the vertical grooves 39c and can vertically slide.

Figure 2:
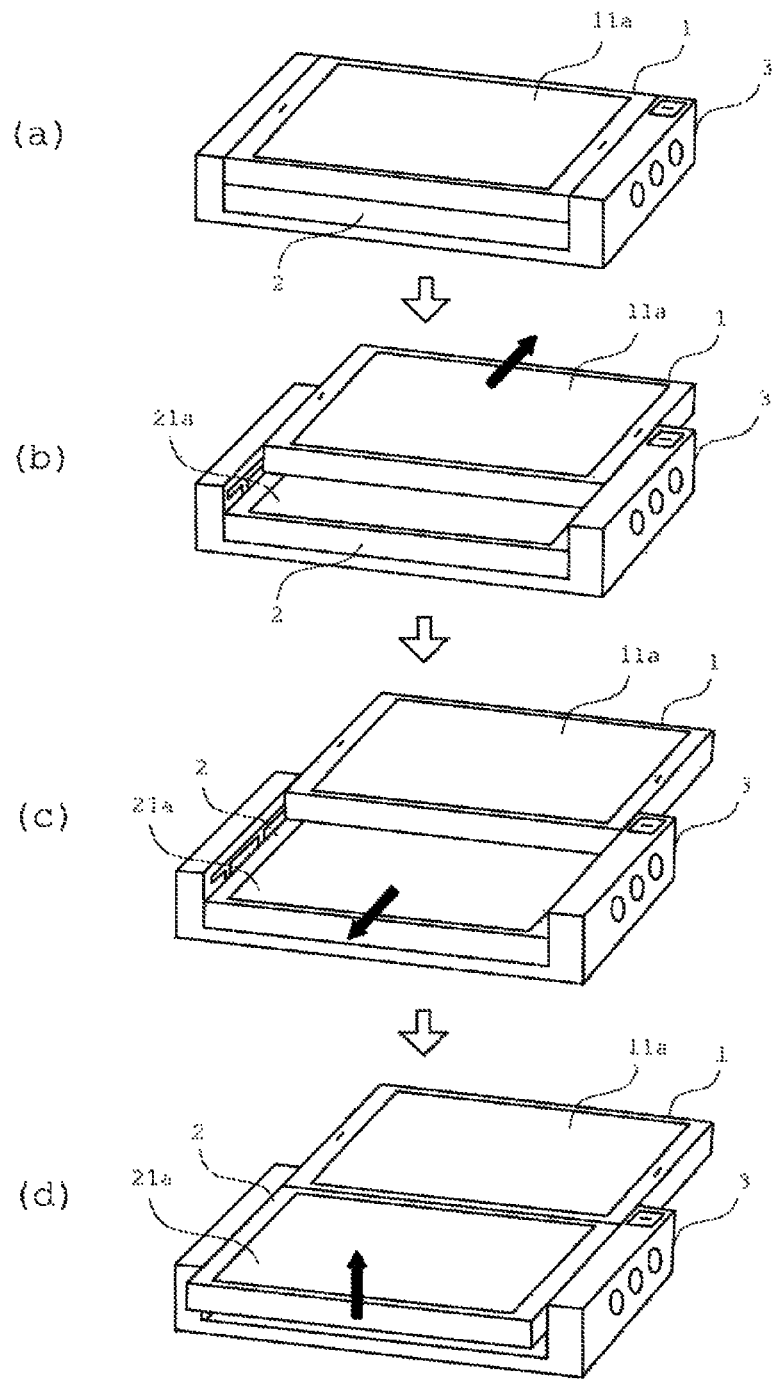
FIG. 2 are diagrams for explaining a switching operation from a first display state on a first display screen to a second display state on the first display screen and a second display screen in the cell phone according to the embodiment.

FIG. 2 are diagrams for explaining a switching operation from a first display state on a first display screen 11a to a second display state on the first display screen 11a and a second display screen 21a in the cell phone according to the embodiment.

In the initial state, as shown in FIG. 2(a), the second cabinet 2 is hidden behind the first cabinet 1. In this state, only the first display area 11a is exposed to the outside. This state is called a "first display state". The switching operation is manually carried out by the user.

First, the user moves the first cabinet 1 rearward as shown in FIG. 2(b). Next, when the rearward movement of the first cabinet 1 is completed, the second cabinet 2 is pulled out forward as shown in FIG. 2(c). By this pulling out operation, when the second cabinet 2 is moved to a position where the second cabinet 2 is completely not superposed on the first cabinet 1, i.e., to a position where the second cabinet 2 reaches a front of the first cabinet 1, the shafts 26 and 27 come to the vertical groove 39c. Thus, the second cabinet 2 is pushed by the coil springs 34 and is moved upward. At that time, the magnet 14 and the magnet 23 attract each other, and a stronger rising force is applied. In this way, as shown in FIG. 2(d), the first cabinet 1 and the second cabinet 2 are arranged side by side such that they are in intimate contact in the longitudinal direction and flush with each other. The first display area 11a and the second display area 21a are combined as one area, and a large screen is formed. This state is called a "second display state".

Figure 3:
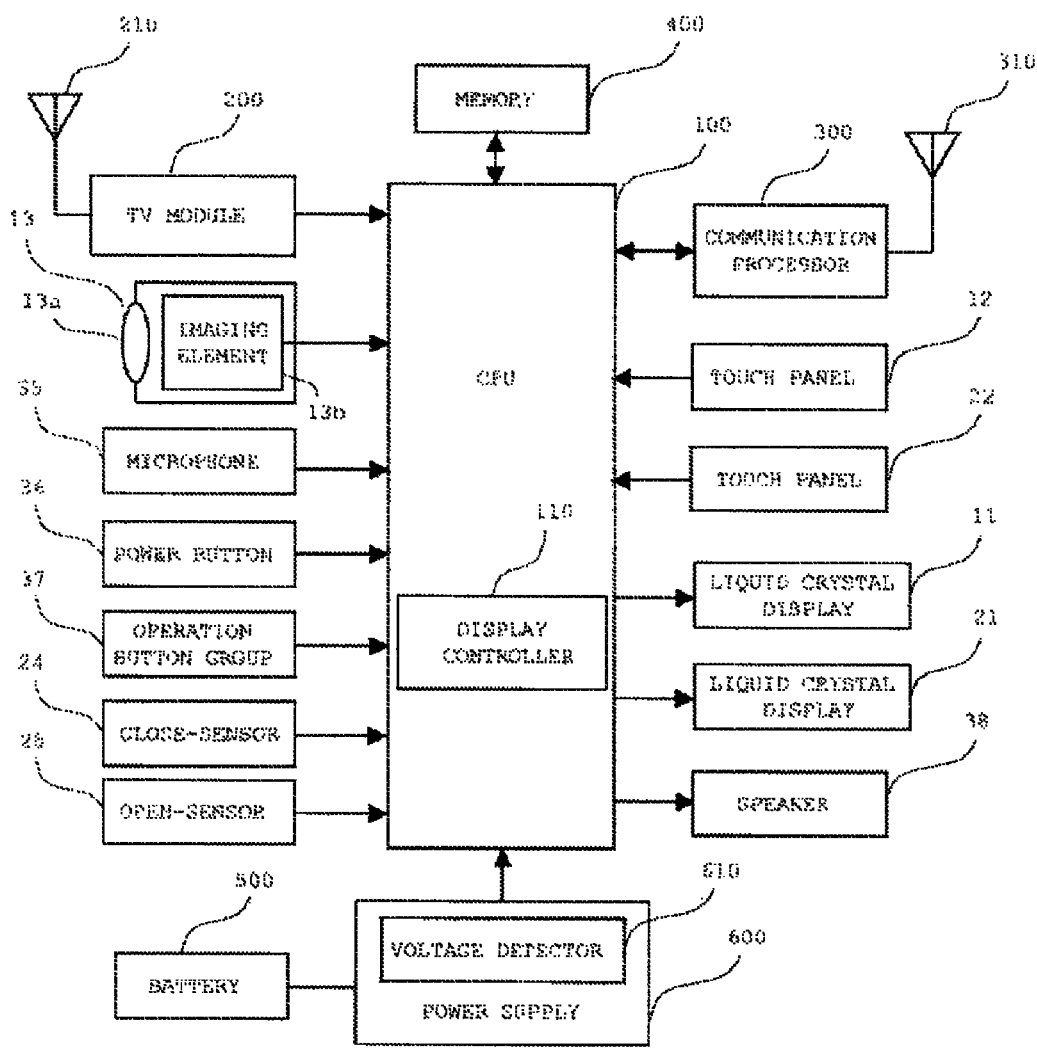
FIG. 3 is a block diagram showing a circuit configuration of the cell phone according to the embodiment.

FIG. 3 is a block diagram showing a circuit configuration of the cell phone according to the embodiment. In addition to the constituent parts described above with reference to FIG. 1, the cell phone further includes a CPU 100, a TV module 200, a communication processor 300, the liquid crystal displays 11 and 21, a memory 400, a battery 500, and a power supply 600.

The TV module 200 includes a TV tuner and the like, converts wave such as digital terrestrial broadcast wave received through an antenna 210 into a video signal, and sends the video signal to the CPU 100.

The camera module 13 includes an imaging lens 13a, an imaging element 13b and the like. The imaging lens 13a forms an image of a subject on the imaging element 13b. The imaging element 13b includes a CCD for example, produces an image pickup signal corresponding to a captured image, and sends the signal to the CPU 100.

The microphone 35 converts a sound signal into an electric signal, and sends the signal to the CPU 100. The speaker 38 plays a sound signal from the CPU 100 as sound.

The communication processor 300 converts a sound signal, an image signal, a text signal, and the like sent from the CPU 100 into a radio signal, and sends the signals to a base station through an antenna 310, as well as converts a radio signal received through the antenna 310 into a sound signal, an image signal, a text signal and the like, and sends the signals to the CPU 100.

The liquid crystal display 11 displays an image on the first display area 11a by a drive signal sent from the CPU 100 (later-described display controller 110). Similarly, the liquid crystal display 21 displays an image on the second display area 21a by a drive signal sent from the CPU 100.

Image data (still image, moving image) of an image shot by the camera module 13, image data (still image, moving image) captured from outside through the communication processor 300, and text data (mail data) and the like are stored in the memory 400 in a predetermined file format.

The battery 500 supplies electricity to the CPU 100 and various parts of the cell phone other than the CPU 100, and includes a secondary battery. The battery 500 is connected to the power supply 600.

The power supply 600 converts a voltage of the battery 500 into a voltage of necessary magnitude and supplies the same to the various constituent parts. The power supply 600 supplies electricity supplied through an input portion (not shown) of an external power supply to the battery 500 to charge it.

The power supply 600 includes a voltage detector 610. The voltage detector 610 detects a voltage of the battery 500 and sends a voltage signal to the CPU 100.

The CPU 100 outputs control signals to various parts such as the speaker 300, the liquid crystal displays 11 and 21 based on input signals from various parts such as the touch panels 12 and 22, the operation button group 37, the microphone 35, the imaging element 13b, and the like, thereby carrying out processes of various modes (a telephone mode, a mail mode, an Internet mode, a television mode, a camera mode, and the like). The CPU 100 determines a remaining battery level of the battery 500 based on the voltage signal from the voltage detector 610.

The CPU 100 includes a display controller 110. The display controller 110 produces an image that is displayed on the liquid crystal displays 11 and 21 in a memory (not shown) that is a work area prepared in the CPU 100, and outputs, to the liquid crystal displays 11 and 21, an image signal (RGB signal) for displaying the produced image. The display controller 110 imports image data sent from the imaging element 13b, image data stored in the memory 400, and image data received through the communication processor 300. The display controller 110 produces an image signal (RGB signal) from the captured image data, and outputs the produced image signal to the liquid crystal displays 11 and 21. An image corresponding to the image signal is displayed on the display areas 11a and 21b of the liquid crystal displays 11 and 21.

When the second cabinet 2 is closed and the cell phone is in the first display state, an image is displayed on the first display area 11a.

Figure 4:
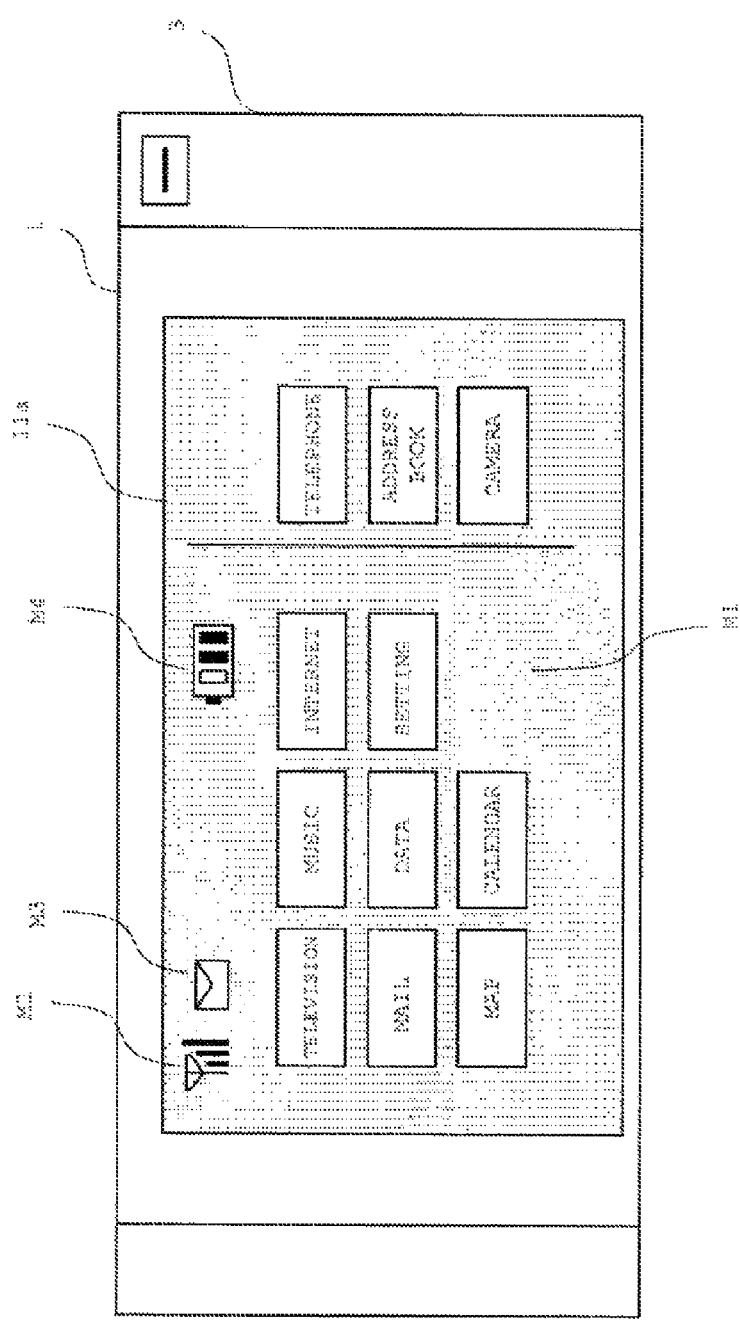
FIG. 4 is a diagram showing a display example of an initial screen (mode selection screen) displayed on a first display area when the first display state is selected in the cell phone according to the embodiment.

FIG. 4 is a diagram showing a display example of an initial screen (function mode selection screen) displayed on the first display area 11a when the first display state is selected in the cell phone according to the embodiment.

Eleven kinds of mode keys M1 such as "Television", "Mail" and "Map" are arranged at a central area of the first display area 11a as a main display. If the user touches a desired mode key M1 on the screen, a functional mode corresponding to that mode key M1 is executed. An antenna symbol M2 showing a receiving state, a mail symbol M3 showing that a mail is received, and a remaining battery level symbol M4 showing a remaining level of the battery are arranged on upper part of the first display area 11a as sub-displays.

In this initial screen, if the user touches the "Data" mode key M1, the mode is shifted to the data display mode. If the user carries out a predetermined operation in the data display mode, the user can check images (picture images and the like) stored in the memory 400. The user can utilize the mode for the purpose of selecting a desired image from these images. In this case, the selected image can be used as a background image of a standby screen of the cell phone, can be moved to another device such as a personal computer, or can be attached to a mail and sent to someone.

Figure 5:
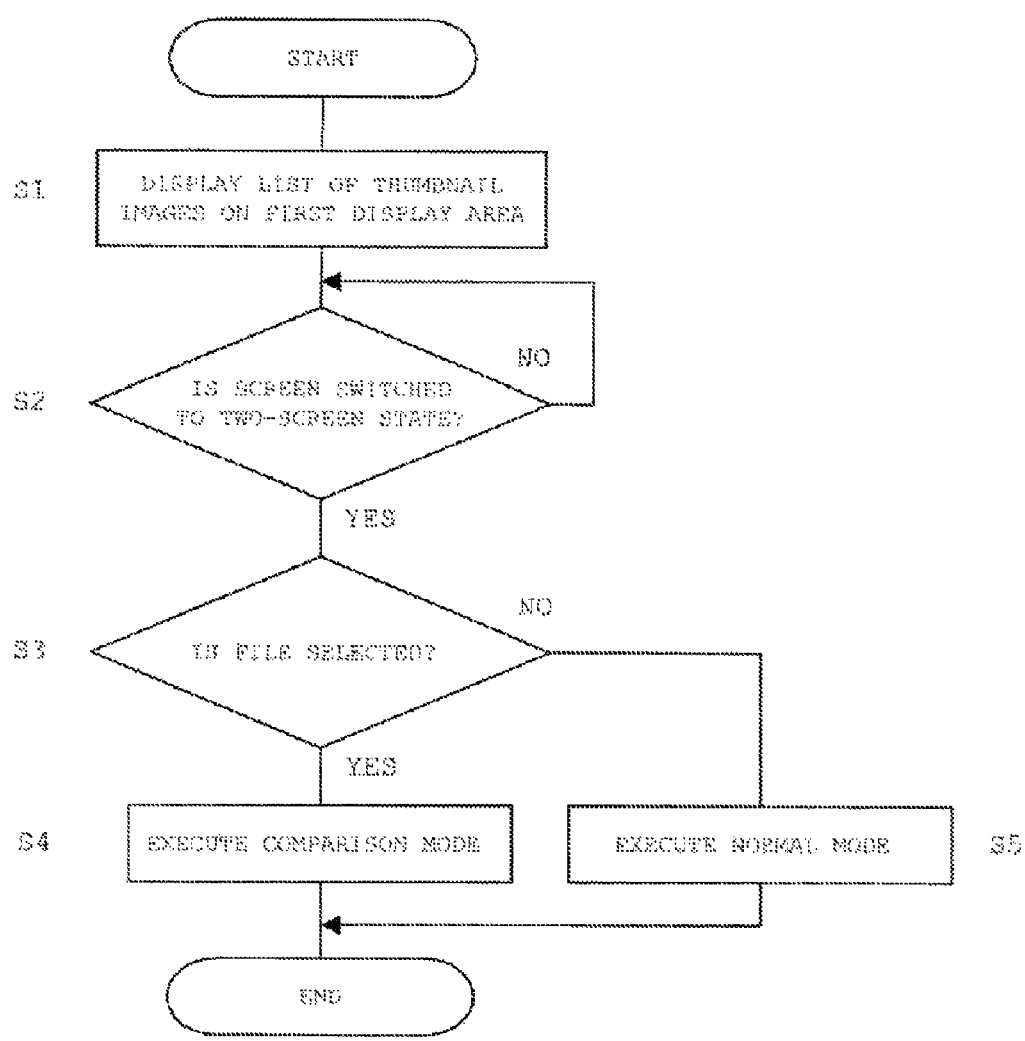
FIG. 5 is a flowchart for explaining a screen display control in a data display mode in the cell phone according to the embodiment.
Figure 6:
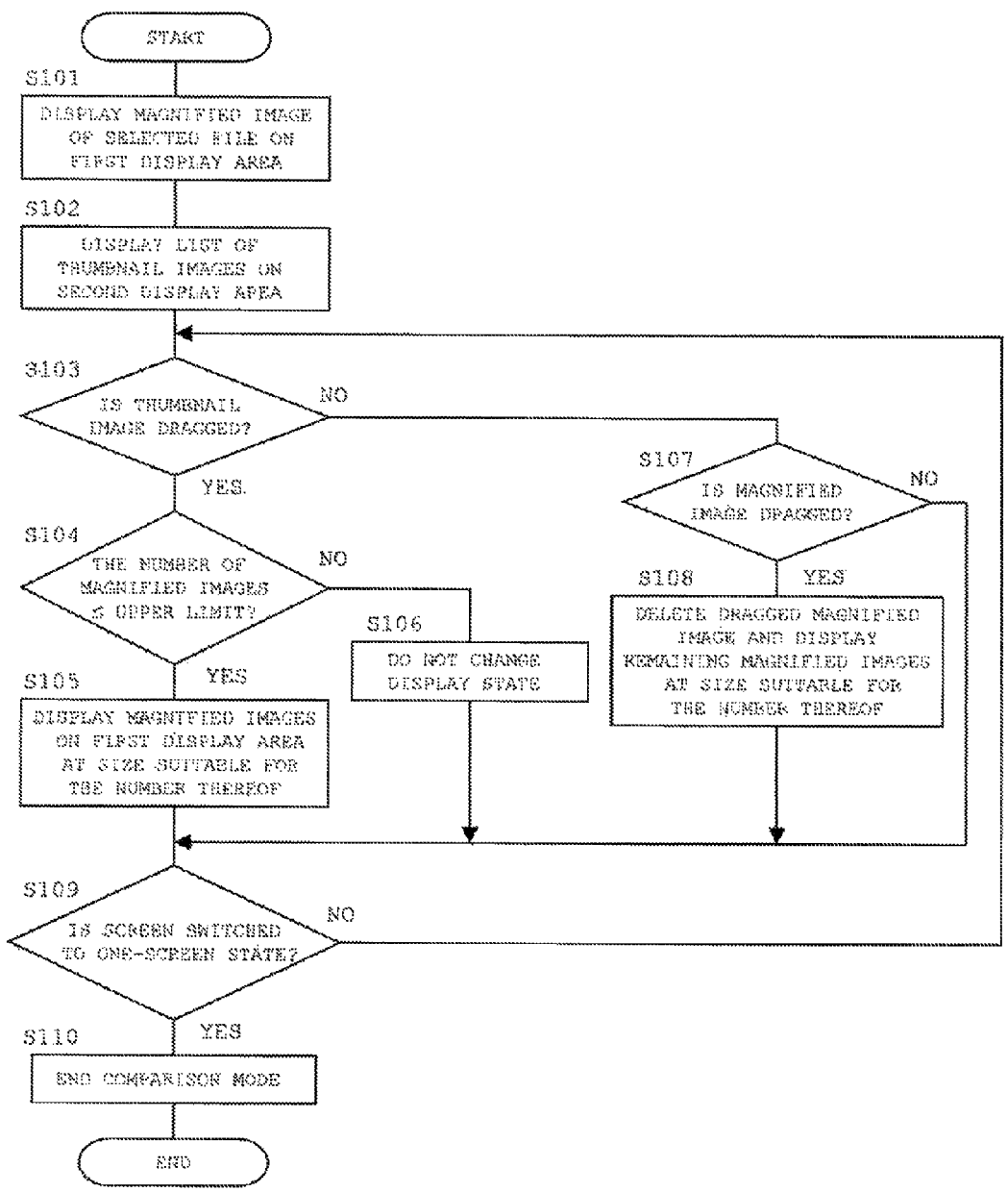
FIG. 6 is a flowchart for explaining the screen display control in a comparison mode executed in the data display mode in the cell phone according to the embodiment.
Figure 7:
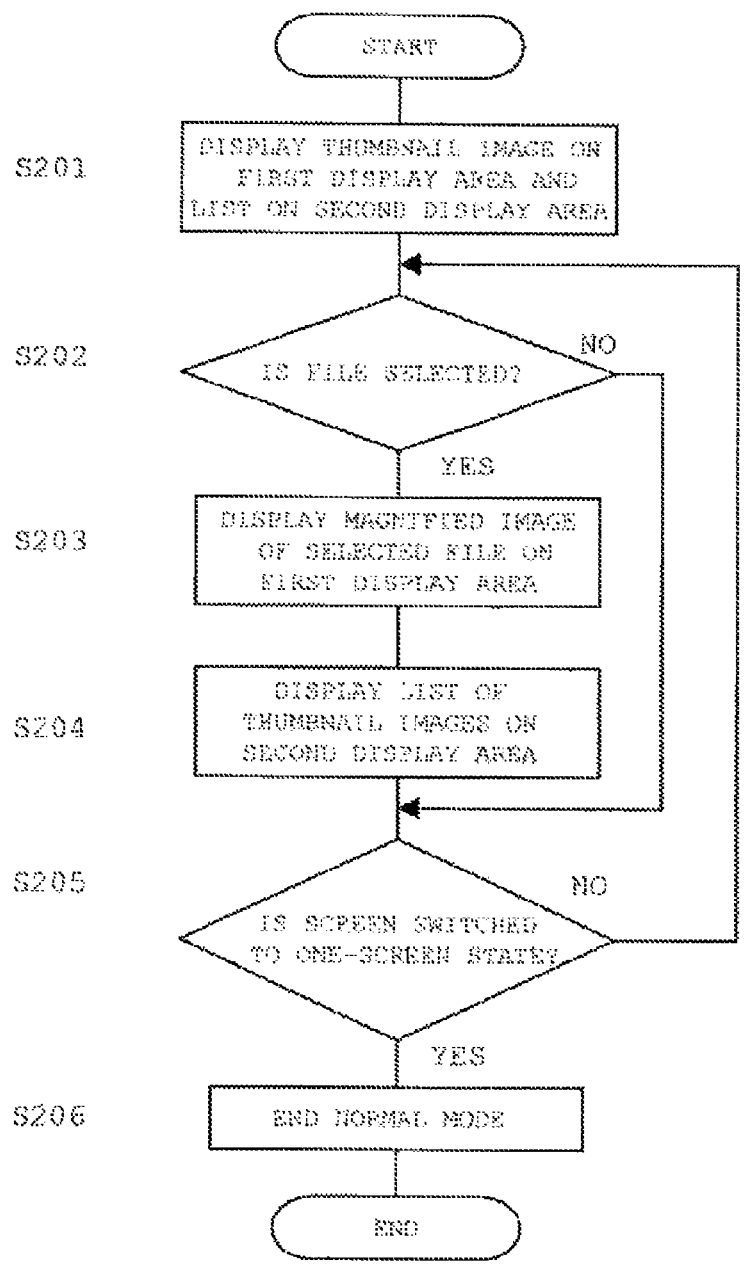
FIG. 7 is a flowchart for explaining the screen display control in a normal mode executed in the data display mode in the cell phone according to the embodiment.
Figure 8:
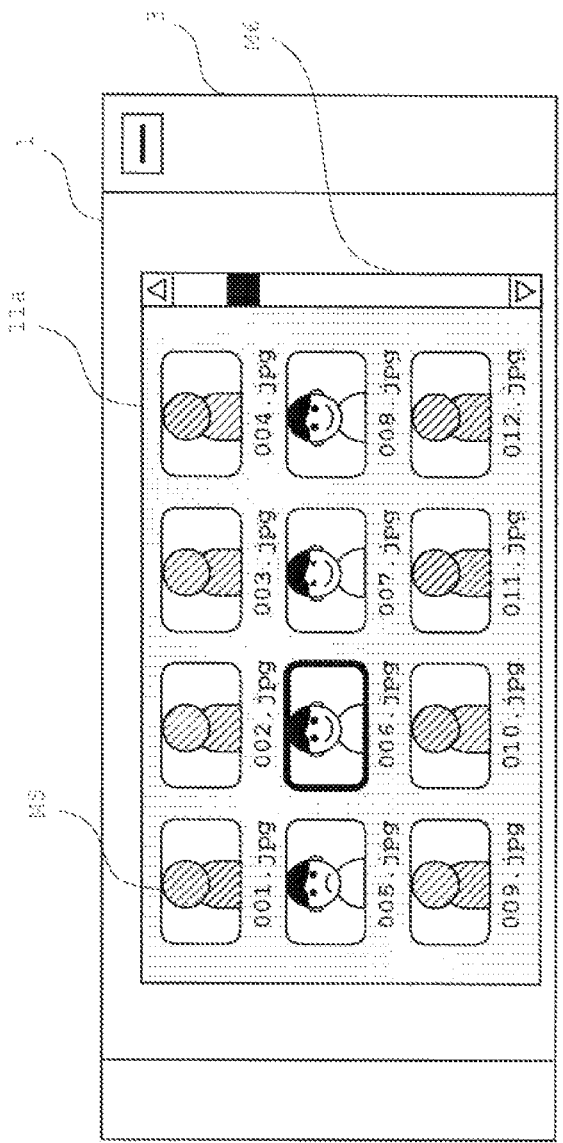
FIG. 8 is a diagram showing an example of a screen display in the first display state in the data display mode in the cell phone according to the embodiment.
Figure 11:
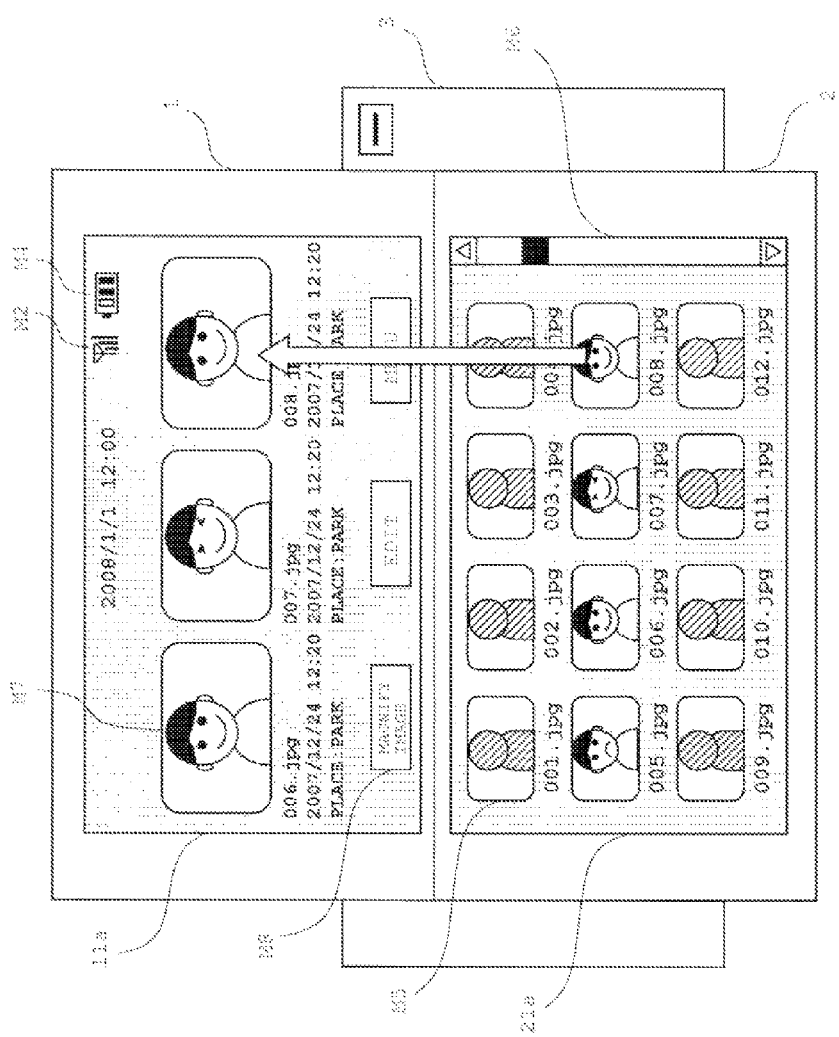
FIG. 11 is a diagram showing an example of a screen display in the comparison mode in the cell phone according to the embodiment.
Figure 12:
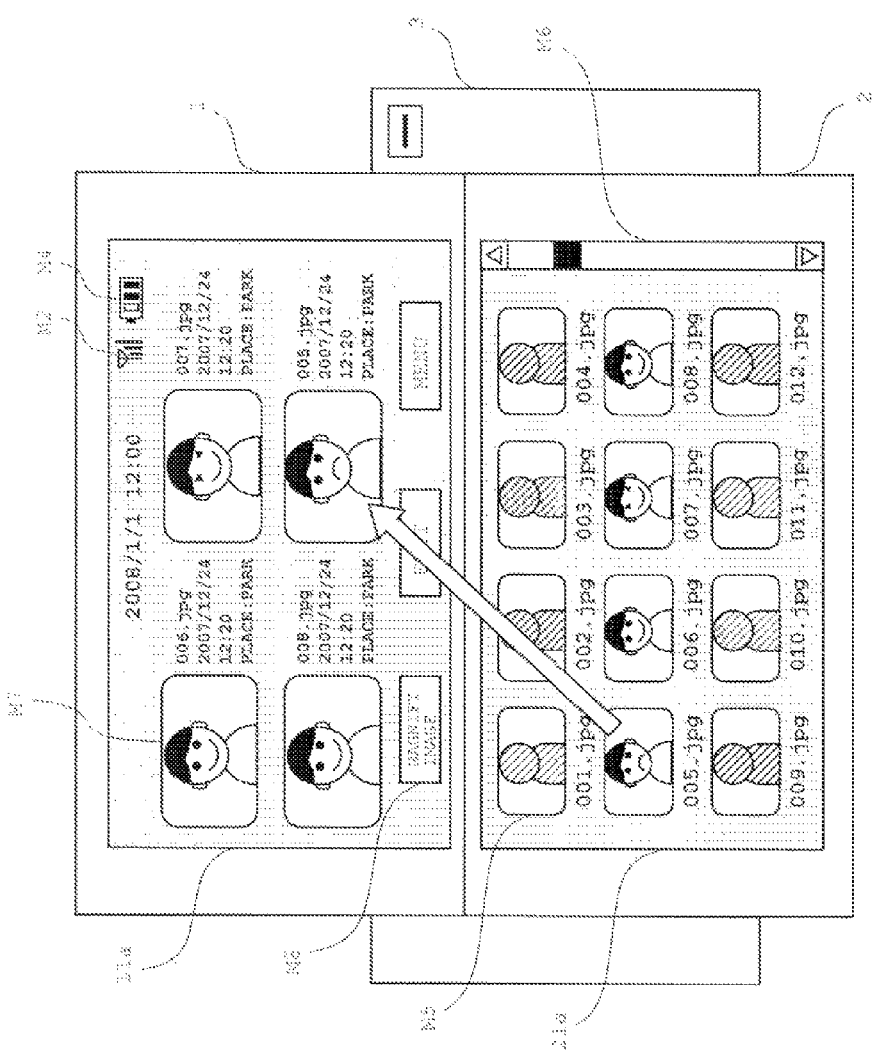
FIG. 12 is a diagram showing an example of a screen display in the comparison mode in the cell phone according to the embodiment.
Figure 13:
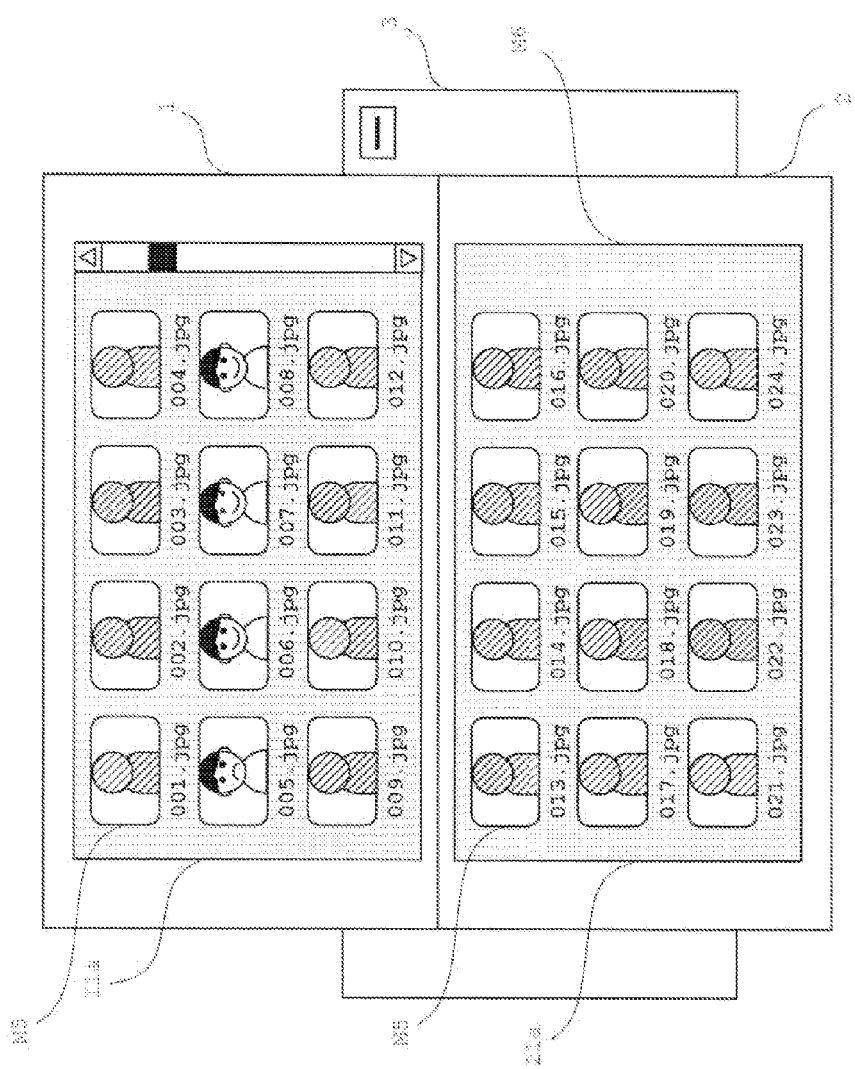
FIG. 13 is a diagram showing an example of a screen display in the normal mode in the cell phone according to the embodiment.

FIG. 5 is a flowchart for explaining a screen display control in the data display mode in the cell phone according to the embodiment. FIG. 6 is a flowchart for explaining the screen display control in a comparison mode executed in the data display mode. FIG. 7 is a flowchart for explaining the screen display control in a normal mode executed in the data display mode. FIG. 8 is a diagram showing an example of a screen display in the first display state in the data display mode. FIGS. 9 to 12 are diagrams showing examples of the screen display in the comparison mode. FIG. 13 is a diagram showing an example of a screen display in the normal mode.

With reference to FIG. 5, if the "Data" mode key M1 is touched, the display controller 110 reads image data of thumbnail images M5 from the memory 400, and sends an image signal for displaying the thumbnail images M5 to the liquid crystal display 11. In this manner, a list of the plurality of thumbnail images M5 is displayed on the first display area 11a (S1: see FIG. 8). At that time, file names of respective images are displayed below the thumbnail images M5. A scroll operating portion M6 for sending the thumbnail images M5 back and forth is displayed on a right end of a first display area 11a.

The thumbnail images M5 are samples (indices) of original images stored in the memory 400. The image data of the thumbnail image M5 is produced by thumbnailing the image data of the original image, and is stored in the memory 400.

In some cases, a plurality of similar images such as successive pictures is included in images stored in the memory 400. When the user selects a desired image (most excellently shot picture for example) from the similar images, the size of the thumbnail image M5 is too small and it is difficult to finely compare the images with each other.

In such a case, the user selects one of the plurality of thumbnail images M5 to be compared, and touches the selected one thumbnail image M5 with a finger. If one file (e.g., "006.jpg") is selected, a display style of that thumbnail image M5 becomes different from those of the other thumbnail images M5, for example a frame of the thumbnail image M5 is thickened. After the user selects the desired file, the user carries out the switching operation to bring the cell phone into the second display state.

When the user carries out the switching operation and the second display state is established, an ON signal from the open-sensor 25 is input to the CPU 100. The display controller 110 determines by the ON signal that the switching operation is carried out (YES in S2). It is also possible to determine that the switching operation is carried out when the signal from the close-sensor 24 becomes OFF, or to determine that the switching operation is carried out when there is no ON signal of the close-sensor 24 and there is an ON signal of the open-sensor 25.

Next, the display controller 110 determines whether the user selects one of files of the thumbnail images M5 displayed in the first display state (S3). If the display controller 110 determines that the file is selected (YES in S3), it executes the comparison mode (S4). The operation in the comparison mode will be described with reference to FIGS. 6, and 9 to 12.

First, the display controller 110 reads image data of the original image of the selected file, and produces an image signal for displaying a magnified image M7 corresponding to this image data. At that time, the magnified image M7 has such a size that when one magnified image M7 is displayed, the magnified image M7 just stays within the screen region of the first display area 11a as large as possible. The display controller 110 sends the image signal produced in this manner to the liquid crystal display 11. Accordingly, the magnified image M7 is displayed on the first display area 11a (S101: see FIG. 9).

At that time, information concerning this image in addition to the file name of this image are displayed on a right position of the magnified image M7. For example, if the image is a picture, shooting time and shooting place are displayed. The current date and time, as well as the antenna symbol M2 and the remaining battery level symbol M4 are displayed on an upper part of the screen region of the first display area 11a. Further, mode keys M8 such as a magnify-image mode, an edit mode, and a menu selection mode are displayed on a lower part of the screen region of the first display area 11a.

Figure 9:
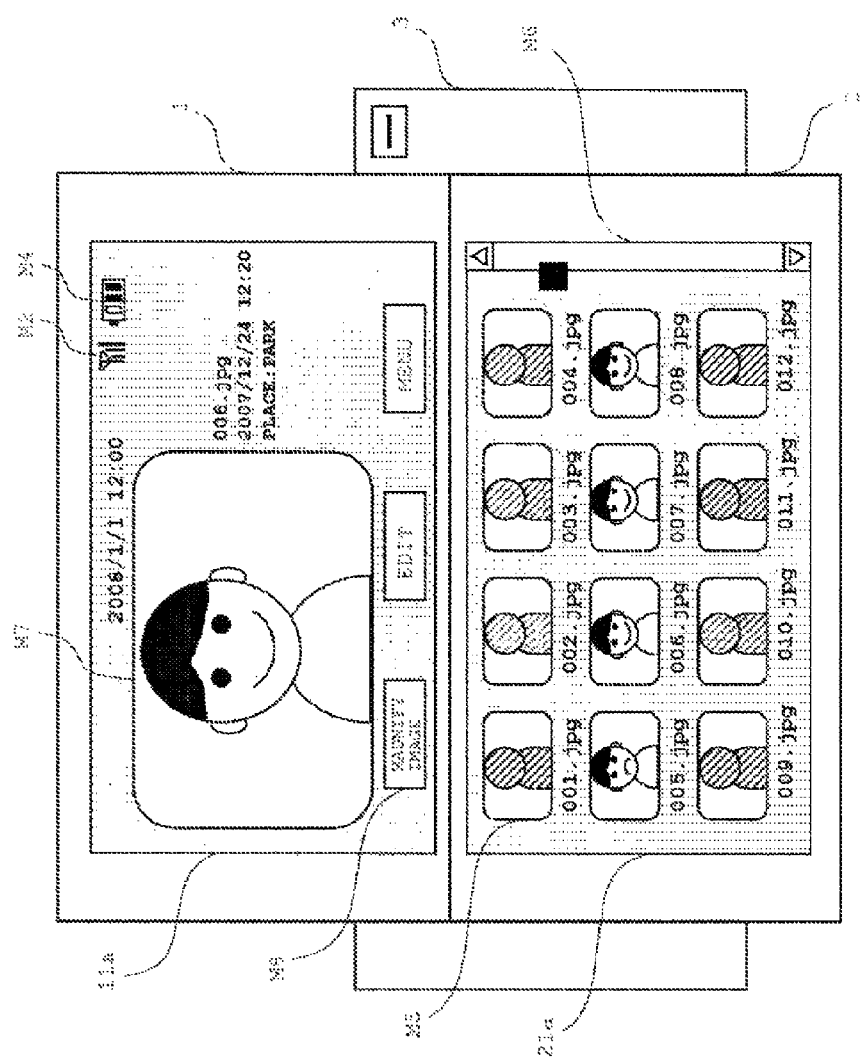
FIG. 9 is a diagram showing an example of a screen display in the comparison mode in the cell phone according to the embodiment.

The display controller 110 further displays a list of the thumbnail images M5 and the scroll operating portion M6 on the second display area 21a (S102: see FIG. 9).

When a magnified image M7 of the selected file is displayed on the first display area 11a, a file that is to be compared with the former file is selected by the user from the list of the thumbnail images M5 on the second display area 21a. In this embodiment, up to four magnified images M7 can be compared with each other on the first display area 11a. The reason why the number of magnified images M7 that can be displayed at a time is limited to four is that if more than four magnified images M7 are displayed, a size per one image becomes too small, and it becomes difficult to finely compare the images with each other.

The user touches a desired thumbnail image M5 (file) with a finger or the like, and moves the thumbnail image M5 onto the first display area 11a while keep touching the second display area 21a with the finger or the like. That is, the user drags the thumbnail image M5 to the first display area 11a. The display controller 110 determines whether one thumbnail image M5 is dragged to the first display area 11a (S103). For example, after the thumbnail image M5 is dragged to an upper end of the second display area 21a, if the thumbnail image M5 is continuously dragged from a lower end of the first display area 11a, the display controller 110 determines that the thumbnail image M5 is dragged from the second display area 21a to the first display area 11a.

If the display controller 110 determines that the thumbnail image M5 is dragged to the first display area 11a (YES in S103), the display controller 110 determines whether the number of displayed magnified images M7 is smaller than the upper limit value (four, in this case) (S104). If the number is smaller than the upper limit value (YES in S104), the display controller 110 reads image data of the original image of the selected file from the memory 400, and produces an image signal for displaying a magnified image M7 which corresponds to the image data and the previously displayed magnified image M7. Sizes of these magnified images M7 are set in accordance with the number of displayed magnified images M7, and the sizes are set such that when the magnified images M7 of that number are displayed, the magnified images M7 stay within the screen region of the first display area 11a as large as possible. The display controller 110 sends the image signal produced in this way to the liquid crystal display 11. Accordingly, magnified images M7 of dragged files are displayed on the first display area 11a at sizes suitable for the number of the magnified images M7 (S105).

Figure 10:
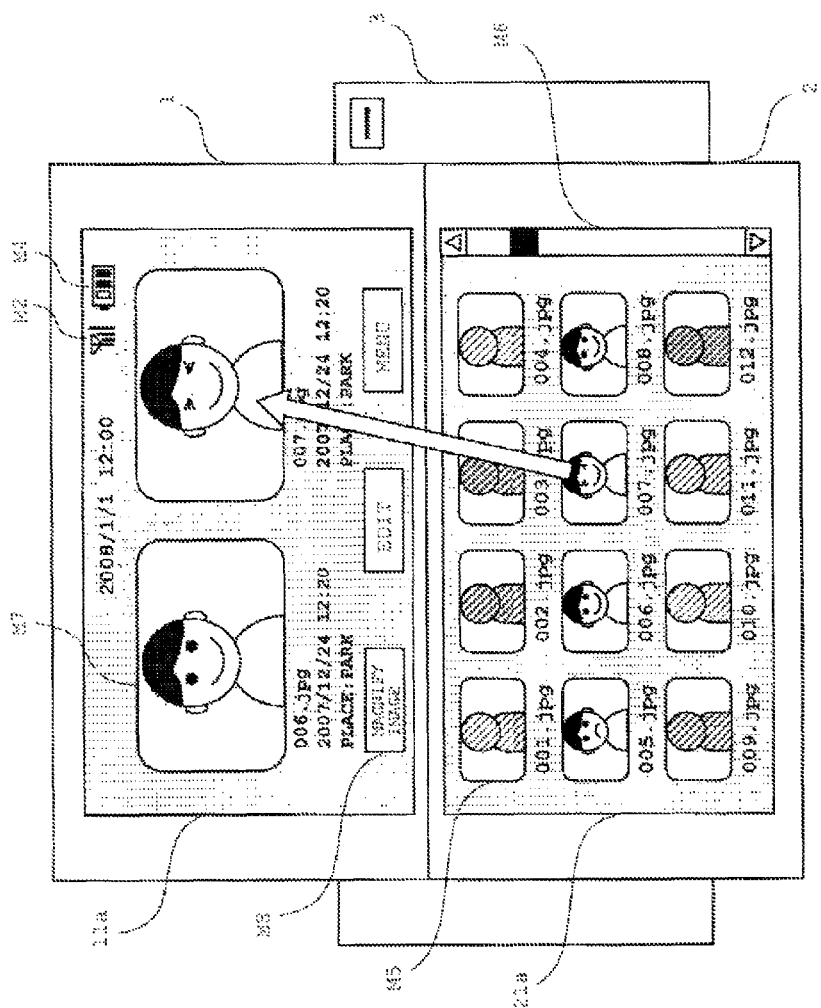
FIG. 10 is a diagram showing an example of a screen display in the comparison mode in the cell phone according to the embodiment.

For example, in addition to the first magnified image M7, when another file is newly dragged and total of two magnified images M7 are displayed on the first display area 11a, the screen becomes as shown in FIG. 10. Further, when two files are newly dragged and total of three magnified images M7 are displayed, the screen becomes as shown in FIG. 11. Further, when three files are newly dragged and total of four magnified images M7 are displayed, the screen becomes as shown in FIG. 12.

At that time, the magnified images M7, the names of the files, and information concerning the images are disposed in accordance with the number of the magnified images M7 such that the sizes of the images become as large as possible. That is, when the number of the magnified images M7 is two or three (see FIG. 11), the magnified images M7 are laterally arranged in one row, and the names of files and information concerning the images are displayed below the respective magnified images M7. When the number of the magnified images M7 is four (see FIG. 12), the magnified images M7 are arranged in a 2 by 2 matrix form, and the file names and information concerning the images are displayed on the right sides of the respective magnified images M7.

In this way, a plurality of images to be compared with each other is displayed at a quite large size as compared to the thumbnail images M5. In this way, the user can finely compare the magnified images M7 with each other and can select a desired image.

If the user newly drags a fourth file and the number of displayed magnified images becomes five in total, the display controller 110 determines in step S104 that the number of magnified images exceeds the upper limit (NO in step S104), the display controller 110 does not change the display state of the first display area 11a (S106). In this case, the user is informed by the drive control of the CPU 100 through the speaker 38 that the dragged image cannot be magnified.

When the user desires to delete one of the magnified images M7 displayed on the display area 11a, the user drags the target magnified image M7 from the first display area 11a to the second display area 21a. If the display controller 110 determines that the magnified image M7 is dragged to the second display area 21a (YES in S107), the display controller 110 deletes the dragged magnified image M7 from the screen, and displays the remaining magnified images M7 at a size suitable for the number of the magnified images M7 (S108). For example, one magnified image M7 is deleted from a state where four magnified images M7 are displayed, the screen style is changed from that shown in FIG. 12 to that shown in FIG. 11. In this way, the user can select a new file and display the corresponding magnified image M7.

When the user switches the second display state to the first display state, the display controller 110 determines that the second display state is switched to the first display state by an OFF signal from the open-sensor 25 (YES in S109). Accordingly, the display controller 110 ends the comparison mode (S110).

With reference back to FIG. 5, in a state where the list of the thumbnail images M5 is displayed on the first display area 11a by the operation in step S1 (see FIG. 8), if it is unnecessary to compare similar images with each other, the user switches the first display state to the second display state without selecting a file. Then the display controller 110 determines in step S3 that no file is selected, and executes the normal mode (S5). The operation in the normal mode will be described with reference to FIGS. 7 and 13.

The display controller 110 first reads further image data of subsequent thumbnail images M5 following the thumbnail images M5 which are already displayed on the first display area 11a, and sends an image signal for displaying the latter thumbnail images M5 to the liquid crystal display 21. Accordingly, the lists of the thumbnail images M5 are displayed on both the first display area 11a and second display area 21a (S201: see FIG. 13). In this case, since the first display area 11a and the second display area 21a become the single screen, if the scroll operating portion M6 is operated, the list of the thumbnail images M5 on both the display areas is scrolled integrally.

Next, when the user selects a desired thumbnail image M5 (file) from the list of the thumbnail images M5 on both the display areas (YES in S202), the display controller 110 produces an image signal for displaying a magnified image M7 of the selected file, and sends the produced image signal to the liquid crystal display 11. Accordingly, the magnified image M7 is displayed on the first display area 11a in the same screen style as that shown in FIG. 9 (S203). That is, the magnified image M7 is displayed in the largest size. Further, the display controller 110 displays a list of the thumbnail images M5 and the scroll operating portion M6 on the second display area 21a (S204). If the user selects a new thumbnail image M5 from the list thereafter, the new magnified image M7 is displayed on the first display area 11a at the largest size by the operations of steps S202 to S204. By touching desired thumbnail images M5 one after another, the user can display magnified images M7 of the largest size individually on the first display area 11a, and the user can swiftly and smoothly check details of the selected images.

In the normal mode, a magnified image M7 of the selected file is only displayed on the first display area 11a, and even if the user drags a thumbnail image M5 on the second display area 21a, a plurality of magnified images M7 is not displayed on the first display area 11a unlike the comparison mode.

If the user switches the second display state to the first display state, the display controller 110 determines that the second display state is switched to the first display state by an OFF signal from the open-sensor 25 (YES in S205). Accordingly, the controller 110 ends the normal mode (S206).

In this embodiment, when a magnified image M7 is displayed on the first display area 11a in the comparison mode or the normal mode, the user can executes three modes, i.e., "Magnify image", "Edit", and "Menu selection" concerning a displayed magnified image M7 by operating the mode key M8.

When magnified images M7 are compared with each other, the user may desire to compare more detailed portions (e.g., small facial expression in a picture of a person). In such a case, the user touches the magnify-image mode key M8. Accordingly, the magnify-image mode is executed.

Figure 14:
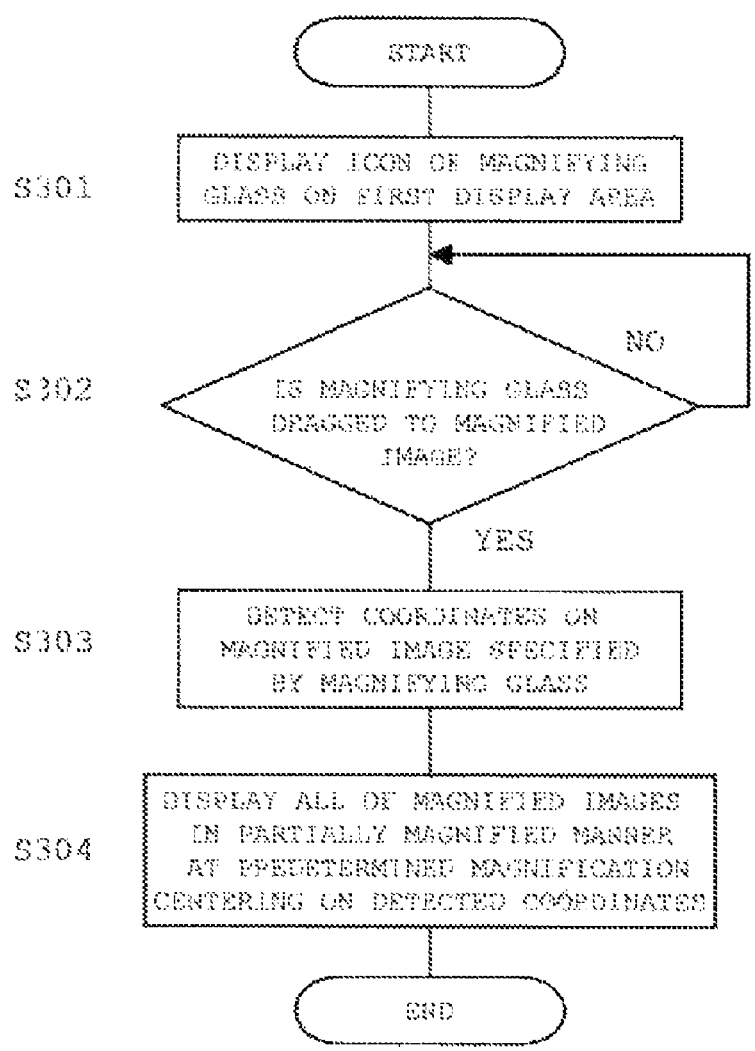
FIG. 14 is a flowchart for explaining a screen display control in an magnify-image mode in the cell phone according to the embodiment.

FIG. 14 is a flowchart for explaining a screen display control in the magnify-image mode. FIG. 15 are diagrams showing examples of screen display in the magnify-image mode. The magnify-image mode is for partially magnifying a part of a magnified image M7 in accordance with operation of the user. The operation in the magnify-image mode will be described with reference to FIGS. 14 and 15.

If the magnify-image mode key M8 is touched, the display controller 110 displays an icon of a magnifying glass on the first display area 11a (S301: see FIG. 15(a)). The user touches the icon of the magnifying glass, and drags the icon to a part on one of the magnified images M7 that the user desires to magnify.

If the display controller 110 determines that the magnifying glass is dragged to the magnified image M7 (YES in S302), the display controller 110 detects coordinates (coordinates in the image) on the magnified image M7 specified by the magnifying glass (S303). The display controller 110 displays a partially magnified image M10 of the magnified image M7 of a predetermined magnification centering on the detected coordinates. At the same time, partially magnified images M10 of all of other magnified images M7 of the same predetermined magnification are displayed centering on the same coordinates as those of the former magnified image M7 (coordinates in the image) (S304: see FIG. 15(*b*)). A size of the partially magnified image M10 is the same as that of the magnified image M7 at that time.

When the displayed plurality of magnified images M7 is similar images like successive pictures, the user can see partially magnified images M10 which are obtained by magnifying the same portions of magnified images M7. Accordingly, when target images are successive pictures of a person, for example, the user can finely compare small facial expressions, and can select the most excellently shot image.

In a display style in FIG. 15, it is preferable that a magnified portion can be appropriately changed. In this case, if the user moves the magnifying glass on a magnified image M7, the display controller 110 again detects coordinates in accordance with the moved magnifying glass, and a partially magnified image M10 is displayed on the first display area 11*a* centering on the new coordinates. In this manner, a portion which the user desires to compare in detail can appropriately be changed, and a desired image can appropriately and easily be selected.

Next, when the user desires to edit a selected image, the user touches the first display area 11*a* with a finger or the like to select one of magnified images M7 and then, and touches the edit mode key M8. In this manner, the edit mode is executed, and a list of various editing process as shown in FIG. 16(*a*) is displayed on the second display area 21*a*. The user selects desired editing process from the list, and can carry out the editing process. For example, if the user selects editing process of "Text", the procedure is shifted to an edit screen, and the user can insert a text in an image on the edit screen.

When the user desires to attach a selected image to an e-mail and to use it as a wallpaper, the user selects one of the magnified images M7 on the first display area 11*a* by touching the same with a finger or the like and then, touches the menu selection mode key M8. In this manner, the menu selection mode is executed, and a list of various processes as shown in FIG. 16(*b*) is displayed on the second display area 21*a*. The user selects desired process from the list, and can carry out the process. If the user selects process of "Set wallpaper" from the list, for example, the selected image can be set as a wallpaper.

According to the embodiment, in the second display state where the first display area 11*a* and the second display area 21*a* face outside, the comparison mode is executed. In the comparison mode, a magnified image M7 of a file selected by the user is displayed on the first display area 11*a* at a size suitable for the number of displayed magnified images M7. The magnified image M7 is quite larger than the thumbnail image M5 in size. According to this, the user can compare magnified images M7 with each other in detail on the first display area 11*a*. Therefore, even if similar images such as successive pictures are included in images stored in the cell phone, it is possible to easily select a desired image from the plurality of images.

Further, the user can freely decide whether a priority should be given to the number of magnified images M7 to be compared or a priority should be given to a size. That is, when the number of images to be compared with each other is large, or when images can easily be compared with each other even if sizes thereof are not so large (for example, when a subject appears big in the picture), the number of magnified images M7 displayed on the first display area 11*a* is increased so that many magnified images M7 can be compared at a time. On the other hand, when the number of images to be compared is small or when it is difficult to compare the images if sizes thereof are not large (for example, when a subject appears small in a picture), the number of magnified images M7 displayed on the display area 11*a* is reduced so that the magnified images M7 can be displayed at a larger size. Therefore, convenience for the user can be enhanced.

According to the embodiment, since a magnified image M7 and information concerning the magnified image M7 are displayed on the first display area 11*a*, the user can select an image with a reference to the information.

According to the embodiment, the magnify-image mode can be executed in a state where a magnified image M7 is displayed on the first display area 11*a*. The magnified image M7 can be partially magnified in the magnify-image mode. If the user specifies a portion to be magnified on one of magnified images M7, the same portions of all of displayed magnified images M7 are magnified. Therefore, the user can compare the magnified images M7 with each other in more detail.

According to the embodiment, the comparison mode is executed by a simple operation, i.e., by selecting a file before switching the first display state to the second display state, and if this operation is not carried out, the normal mode is executed. Therefore, when it is unnecessary to compare similar images with each other, the user may not select the thumbnail images in the first display state. In this case, the user sequentially touches desired thumbnail images M5 to display the selected thumbnail images on the first display area 11*a* at the largest size, and the user can smoothly and swiftly check the details of the selected image with the largest magnified images M7 in size.

According to the embodiment, an operation mode can be shifted to the comparison mode by the simple operation, i.e., by selecting a file before switching the first display state to the second display state. Therefore, it is unnecessary to separately operate a special key or the like, and the operation mode can easily be shifted to the comparison mode.

Figure 17:
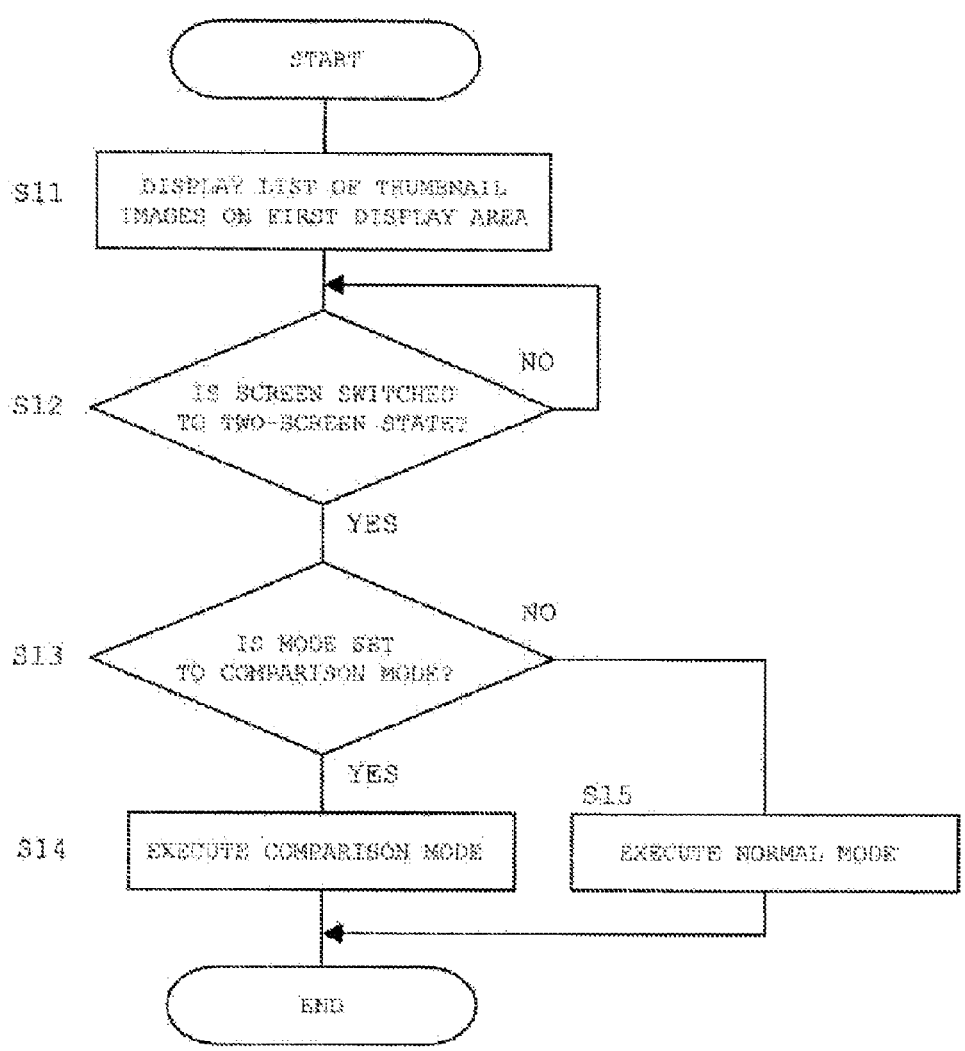
FIG. 17 is a flowchart for explaining a modification of the screen display control in the data display mode in the cell phone according to the embodiment.

Although the embodiment of the invention is described above, the invention is not limited to this, and the embodiment can be also appropriately and variously modified. For example, the embodiment can be modified as follows:

FIG. 17 is a flowchart for explaining a modification of the screen display control in the data display mode. FIGS. 18 and 19 are diagrams showing examples of screen display in the modification.

In this modification, the user previously set which of the comparison mode and the normal mode should be executed. The setting of the modes can be carried out by operating the "Setting" mode key M1 in the initial screen shown in FIG. 4.

Referring to FIG. 17, if the "Data" mode key M1 in the initial screen in FIG. 4 is touched, the display controller 110 displays a list of a plurality of thumbnail images M5 on the first display area 11*a* (S11). At that time, a screen style is the same as that shown in FIG. 8.

When the display controller 110 determines that the switching operation to the second display state is carried out (YES in S12), it determines whether a display mode after the switching operation is set to the comparison mode (S13). If it is determined that the display mode is set to the comparison mode (YES in S13), the comparison mode is executed (S14). On the other hand, if the display controller 110 determines that the operation mode is not set to the comparison mode (NO in S13), the normal mode is executed (S15).

Here, when the user selects a predetermined thumbnail image in the first display state, the process in S14 is the same as that in the comparison mode of the above embodiment.

That is, in this case, a magnified image M7 of a file selected at the time of the first display state is displayed on the first display area 11a by the operation in step S101 in FIG. 6.

When a predetermined thumbnail image M5 is not selected by the user in the first display state, the process in S14 is different from that of the above embodiment. In this case, in the embodiment above, the comparison mode is not executed and a list of the thumbnail images M5 is displayed on both the first display area 11a and second display area 21a, but in this modification, the comparison mode is executed in this case also.

In this case, in the modification, a message which prompts to select a file is displayed on the first display area 11a instead of step S101 in FIG. 6 (see FIG. 18). In this state, if the user drags the first file from the second display area 21a to the first display area 11a, the display controller 110 executes the same processes as those in steps S103 to S105 in FIG. 6. Accordingly, the first magnified image M7 is displayed on the first display area 11a as shown in FIG. 19. Thereafter, the user can drag up to four files to the first display area 11a and display the images at the magnified size in the same manner. A profess of deleting an image on the first display area 11a or partially magnifying the image is the same as that described above.

When a predetermined thumbnail image M5 is not selected by the user in the first display state, the process in S15 is the same as that of the normal mode in the embodiment. When a predetermined thumbnail image M5 is selected by the user in the first display state, the process in S15 is different from that of the embodiment. In this case, the comparison mode is executed instead of the normal mode in the embodiment, but in the modification, the normal mode is executed.

In this case, in the modification, a magnified image M7 of a file selected by the user in the first display state is displayed on the first display area 11a instead of step S201 in FIG. 7. The screen style in this case is the same as that shown in FIG. 9. In this state, if a new thumbnail image M5 is selected from the list by the user, the same operations as those in steps S202 to S204 are executed, and a new magnified image M7 is displayed on the first display area 11a in the largest size.

In the embodiment, a magnified image M7 is displayed on the first display area 11a in the second display state, and a list of thumbnail images M5 is displayed on the second display area 21a. However, a magnified image M7 may be displayed on the second display area 21a and a list of thumbnail images M5 may be displayed on the first display area 11a on the contrary.

Although information concerning an image is always displayed together with a magnified image M7 in the embodiment, the display controller 110 may not display such information if the user sets a non-display mode. In this case, when the information is not displayed, the display controller 110 may utilize a space created by this setting to increase a size of a magnified image. According to this configuration, in a state where the user desires to give priority to the size of the magnified image, the user can compare images with each other at a larger size by setting the information non-display mode.

In the embodiment, the operation of dragging a thumbnail image M5 to the first display area 11a is employed as the operation of selecting a thumbnail image M5 (file) from a list for displaying a magnified image M7, but the invention is not limited to this operation, and other operations may be employed.

In the embodiment, in the magnify-image mode, in addition to a magnified image M7 having a specified position, partially magnified images M10 of all of displayed magnified images M7 are displayed, but the invention is not limited to this. It is possible to employ such a configuration that a partially magnified image M10 of a magnified image M7 having a specified position and at least one more magnified image M7 are displayed. However, it is preferable that partially magnified images M10 of all of displayed magnified images M7 are displayed if there is no special problem.

In the embodiment, a position on a magnified image M7 which the user desires to magnify is specified by the icon of the magnifying glass in the magnify-image mode, but the invention is not limited to this. The icon such as the magnifying glass may not be displayed, and a position may be specified by directly touching the position with a finger or a touch pen, or the like.

In the embodiment, it is described that only one file (thumbnail image M5) is selected in the first display state before this state is shifted to the second display state, but two or more (up to four) files (thumbnail images M5) may be selected in the first display state. In this case, if the first display state with two selected thumbnails is shifted to the second display state, the screen shown in FIG. 10 is displayed in the second display state.

The embodiment of the present invention can appropriately and variously be modified within a range of a technical idea shown in claims.

What is claimed is:

1. A terminal device with a display function, the terminal device comprising:
   a first display unit;
   a second display unit;
   a display controller for controlling display of the first and second display units;
   a storage section for storing a plurality of sets of image information; and
   a mechanism for disposing the first and second display units at positions where display areas of both the first and second display units face outside,
   wherein the display controller displays a list of first images, based on the image information, on one of the first and second display units in a state where both of the display areas face outside, and the display controller displays, on the other display unit, one or more second images, corresponding to one or more of the first images selected from the list, at a size suitable for the number of the second images displayed on the display area of the other display unit, and
   wherein when a predetermined position on the second image is specified, the display controller magnifies the specified second image and at least one of other second images at a predetermined magnification and displays these second images centering on the specified position.

2. A terminal device with a display function, the terminal device comprising:
   a first display unit;
   a second display unit;
   a display controller for controlling display of the first and second display units;
   a storage section for storing a plurality of sets of image information; and
   a mechanism for disposing the first and second display units at positions where display areas of both the first and second display units face outside,
   wherein the display controller displays a list of first images, based on the image information, on one of the first and second display units in a state where both of the display areas face outside, and the display controller displays, on the other display unit, one or more second images, corresponding to one or more of the first images selected from the list, at a size suitable for the number of the second images displayed on the display area of the other display unit, and wherein the mechanism supports the first and second display units such that it is possible to switch between a first disposition where only one of the two display areas faces outside and a second disposition where both of the display areas face outside, and the display controller displays the list of the first images on the display area which faces outside in the first disposition, and when the disposition of the first and second display units is shifted to the second disposition in a state where any of the first images is selected from the list, the display controller displays one or more of the second images corresponding to one or more of the selected first image at the size on one of the first and second display units.

3. The terminal device with the display function according to claim 2, wherein the display controller displays the second image and information concerning that second image on the display area of the other display unit.

4. The terminal device with the display function according to claim 2, wherein when the first image is not selected in the first disposition, the display controller displays the list of the first images on one or both of the display areas in the second disposition without displaying the second image, and if the first image is selected thereafter, the display controller displays a third image which is obtained to magnify the selected first image in a size larger than the size on one of the display areas.

5. A terminal device with a display function, the terminal device comprising:
   a first display unit;
   a second display unit;
   a mechanism for disposing the first display unit and the second display unit in both a first display state, in which only one of the first display unit and the second display unit is exposed, and a second display state, in which both the first display unit and the second display unit are exposed; and
   a display controller that controls a display on the first display unit and a display on the second display unit by,
      if the first and second display units are in the first display state, displaying a selectable list of images as thumbnails on the display of the exposed one of the first and second display units, and,
      in response to the first and second display units being switched from the first display state to the second display state while one or more images in the list of images are selected, displaying the selectable list of images as thumbnails on the display of one of the first and second display units, and displaying the selected one or more images, in a size larger than the corresponding thumbnails, on the display of the other one of the first and second display units.

6. The terminal device according to claim 5, wherein the display controller further, in response to the first and second display units being switched from the first display state to the second display state while no images in the list of images are selected, displays the selectable list of images as thumbnails across the displays of both the first display unit and the second display unit.

7. The terminal device according to claim 5, wherein the display controller further, in response to a first user selection of one or more of the images from the selectable list of images on the display of the one of the first and second display units, displays the one or more images selected by the first user selection on the other one of the first and second display units.

8. The terminal device according to claim 7, wherein the first user selection comprises a drag operation from the one of the first and second display unit to the other one of the first and second display units.

9. The terminal device according to claim 7, wherein the display controller further, in response to a second user selection of one or more of the images displayed on the other one of the first and second display units, removes the one or more images selected by the second user selection from the other one of the first and second display units.

10. The terminal device according to claim 9, wherein the second user selection comprises a drag operation from the other one of the first and second display units to the one of the first and second display units.

11. The terminal device according to claim 9, wherein the display controller, in response to the first user selection and the second user selection, sets sizes of the one or more images displayed on the other one of the first and second display units to be as large as possible within the display of the other one of the first and second display units.

12. The terminal device according to claim 5, wherein the display controller further, in response to a user selection of a coordinate of a first image displayed on the other one of the first and second display units, displays a magnified portion of the first image centered on the coordinate.

13. The terminal device according to claim 12, wherein the display controller further, in response to the user selection of the coordinate of the first image while a second image is displayed on the other one of the first and second display units, displays a magnified portion of the second image centered on the same coordinate.

* * * * *